Aug. 4, 1931.    O. J. BREADY    1,817,873
POWER DRIVEN IMPLEMENT
Filed March 2, 1929    2 Sheets-Sheet 1

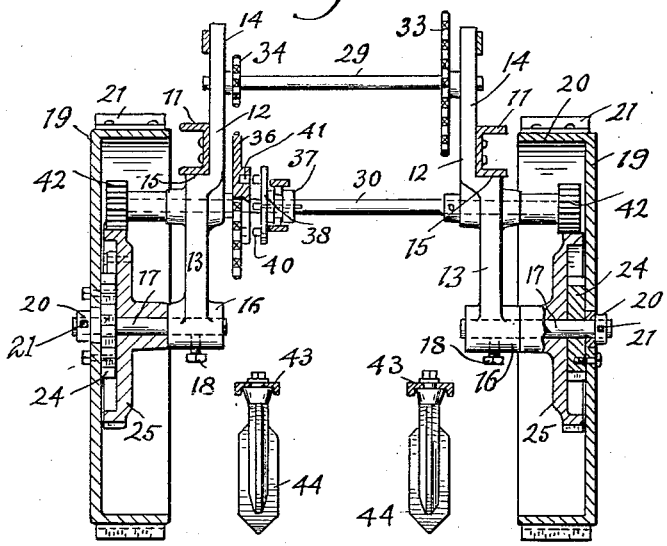
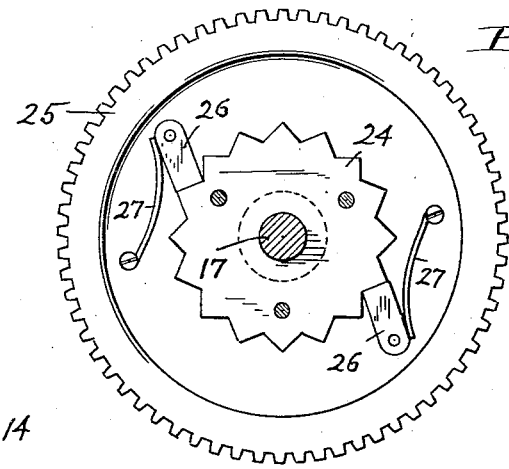

Patented Aug. 4, 1931

1,817,873

UNITED STATES PATENT OFFICE

OWEN J. BREADY, OF CLEVELAND, OHIO

POWER DRIVEN IMPLEMENT

Application filed March 2, 1929. Serial No. 344,005.

This invention relates to implements and more particularly to power driven agricultural implements.

An object of this invention is to provide a power driven implement in which the resistance against movement of the tool serves to increase the tractive efficiency of the driving wheels.

Another object is to provide a power driven implement having a novel form of wheel bracket.

Another object is to provide a power driven implement having a flexible connection between the driving wheels.

The invention may be further briefly summarized as consisting in certain novel arrangements and combinations of parts hereinafter described and particularly set out in the appended claims.

In the accompanying drawings forming a part of this application,

Fig. 3 is a transverse sectional view taken on line 3—3 of Fig. 2.

Fig. 4 is an enlarged detail view of the ratchet mechanism; and

Fig. 5 is a detail view of one of the wheel brackets.

Figure 1:
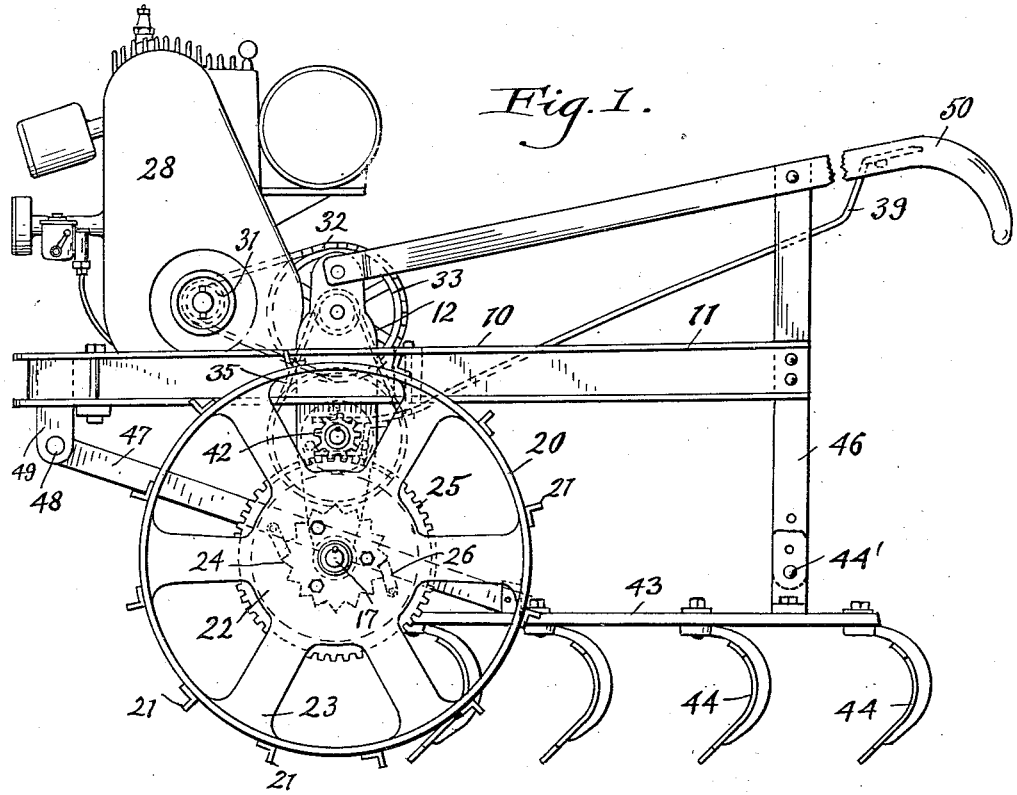
Figure 1 is a side elevation of an implement constructed in accordance with my invention.

Referring now to the drawings for a detailed description of my power driven implement, I show a horizontal frame 10 which is preferably constructed by bending a channel member to U-shape to provide longitudinally extending parallel side members 11. For supporting the frame I provide wheel brackets 12 which are attached to the side members intermediate the ends of the frame. These wheel brackets are constructed with a portion 13 extending downwardly from the frame, and a projection 14 which extends upwardly and is laterally offset from the downwardly extending portion so as to provide shoulders 15 upon which the side members of the frame may rest. The downwardly extending portion of each wheel bracket is provided with a boss 16 in which a stub shaft 17 is non-rotatably held as by means of a set screw 18.

For driving and supporting the implement, wheels 19 are rotatably mounted upon the stub shafts 17 and retained thereon by means of collars 20 which are secured to the stub shafts as by means of set screws 21. The wheels 19 are provided with rims 20 upon which cleats 21 are attached for increasing the tractive power of the wheels. The rims are connected to a hub portion 22 by means of spokes 23 in such a manner that the outer surface of the spokes and the hub portion is flush with one edge of the rim. A ratchet wheel 24 is bolted or otherwise secured against the inner surface of the hub portion of each wheel, and between the ratchet wheel and the boss 16 there is rotatably mounted upon each stub shaft 17 a gear 25, which is hollowed out to provide a recess in which the ratchet wheel is received. It should be noted, that with the spokes and hub portion of the wheels being of the same thickness and forming a surface flush with one edge of the rim, the wheels may be disconnected from the ratchet wheels 24 and reassembled with the flanges 20 extending outwardly from the frame instead of inwardly as shown in Fig. 3. By arranging the wheels in this manner, with the flanges extending outwardly, the wheel spread of the implement can be materially increased to accommodate rows of vegetation which are spaced wide apart.

For operatively connecting the gears 25 with the ratchet wheels 24 I may provide pawls 26 lying within the recess of the gear 25 and pivotally attached to the latter. Springs 27 may be provided for pressing the pawls 26 into engagement with the teeth of the ratchet wheel 24 to establish a driving connection between the rotatable gears and the wheels in which the gears are the driving members and the wheels are the driven members.

As a source of power for driving or propelling the implement a motor 28 is mounted on the frame 10, and through gearing supported by the wheel brackets 12 transmits driving torque to wheels 19. This gearing comprises a counter-shaft 29 having its ends journaled in the extensions 14 of the wheel brackets and a counter-shaft 30 which is journaled in the depending portion of the wheel brackets. For transmitting power to the counter-shaft 29 the motor is preferably provided with a driving sprocket 31 which is connected by means of a chain 32 to a sprocket 33 secured on the counter-shaft 29. A second sprocket 34 is secured to the counter-shaft 29 and by means of the chain 35 drives the sprocket 36 which is freely rotatable upon the counter-shaft 30. For connecting the sprocket 36 to the counter-shaft 30 I provide a clutch 37 which, in this instance, comprises a clutch disk or collar 38 which is splined to the counter-shaft 30 for rotation therewith and adapted to be moved axially of this shaft by means of operating lever 39. The clutch disk is provided with spaced pins 40 which engage in correspondingly spaced recesses 41 provided in the hub portion of the sprocket 36 when the disk is moved toward the sprocket by the operating lever. On the ends of the counter-shaft 30 are keyed, or secured in any suitable manner, driving pinions 42 which mesh with and drive the gears 25, which in turn rotate the wheels 20 through the ratchet mechanism. This ratchet mechanism provides a flexible connection between the wheels which allows one of the wheels to be rotated independently of the other, thereby permitting the implement to be pivoted on one wheel when it is desired to turn the machine around.

Figure 2:
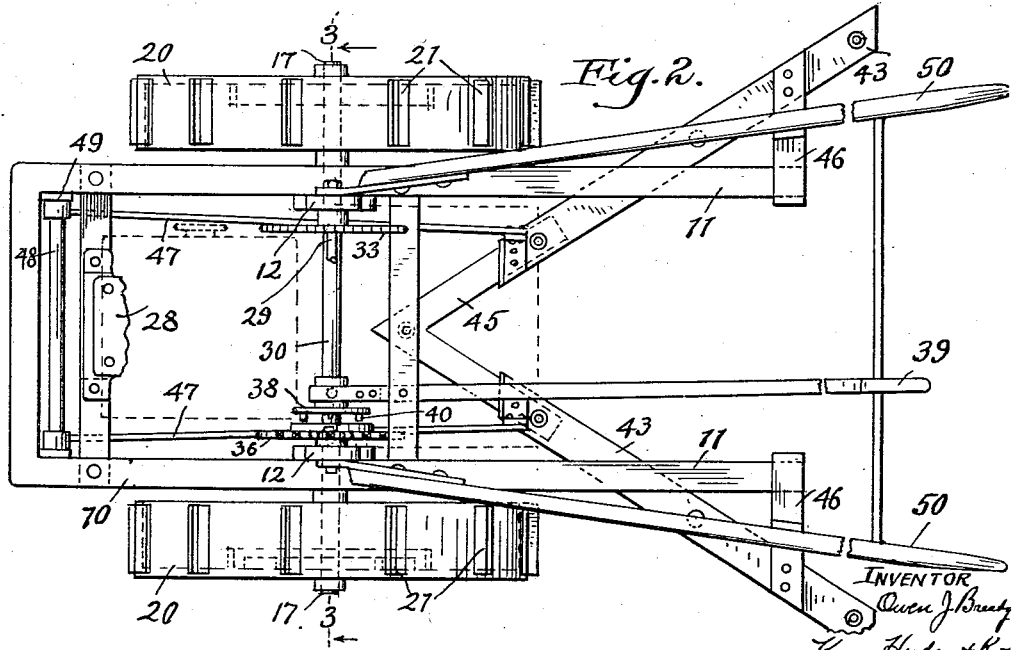
Fig. 2 is a plan view of my implement with the motor removed.

A tool 42, which in this instance is represented as a harrow, is connected to the frame so as to be drawn along as the implement is propelled. This harrow consists of bars 43 to which teeth 44 are bolted or otherwise secured. The bars carrying the teeth 44 are preferably positioned to form a V-shaped arrangement as shown in Fig. 2, in which a detachable portion 45, carrying one of the teeth 44, is adapted to be bolted to the bars 43 to complete the V-shaped arrangement. This detachable portion may be removed when the implement is being used to straddle a row of vegetation, and may be replaced when the implement is used between rows of vegetation. The rear ends of the bars are preferably pivotally and adjustably connected at 44' to upright members 46 which are rigidly attached to the frame 10. At their forward ends the bars are pivotally connected, by means of draw bars 47, to a transverse rod 48 which is supported at the forward end of the frame 10 by means of clips 49. By means of this draw bar connection the harrow is moved as the implement is being propelled, and the resistance which the harrow offers acts upon the forward end of the frame 10 as a force tending to pull this end of the frame downwardly thereby causing the wheels 20 to be pressed down into firm driving engagement with the earth. Furthermore with the draw bars 47 pivotally connected to the rod 48, at the forward end of the frame, a flexible connection between the harrow and the frame is afforded which permits adjustment of the harrow and also permits some movement in a vertical direction while in use, thus insuring smoother operation of the implement and causing the teeth of the harrow to remain in the soil to the desired depth while the wheels travel over uneven ground.

For guiding and controlling the implement a pair of handles 50 may be connected to the extensions 14 of the wheel brackets and to the upright members 46. By connecting the handles in this manner the control and operation of the implement is greatly facilitated because power applied to the handles for guiding and swinging the implement is transmitted directly to the wheels through the wheel brackets to which the handles are attached. As an additional factor contributing to the ease of operation of my implement I prefer to mount the motor 28 forward of the shafts upon which the driving wheels are mounted, and in this position the weight of the motor balances the weight of the harrow which is connected to the frame on the opposite side of the wheel shafts. With this arrangement very little force need be applied to the handles 50 for guiding and swinging the implement or for elevating or depressing the harrow.

Distinct advantages resulting from the use of the wheel brackets which I have shown and described will be apparent because these rigid brackets permit the use of stub shafts 17 for carrying the wheels 20 instead of an axle extending transversely of the implement. By eliminating such a transversely extending axle better clearance is afforded for growing vegetation which means that the implement will have greater utility because it can be used to straddle rows of comparatively high vegetation. Furthermore, these wheel brackets serve as bearings for the counter-shafts 29 and 30 through which the motor is operatively connected to the driving wheels, and also provide a means for connecting the operating handles to the implement at a point where force applied to these handles will be most effective, thus requiring the minimum of effort in guiding and controlling the implement.

While I have shown and described in detail one form of my apparatus, it should be understood that various tools, such as a plow and the like, may be used in place of the harrow illustrated, and that I do not limit my invention to the precise arrangements and details shown and described, but regard my invention as including such modifications and alterations as do not involve a departure from the spirit of the invention and the scope of the appended claims.

Having described my invention, I claim:

1. In a power driven implement the combination of a frame, a motor mounted on said frame, brackets attached to said frame intermediate its ends, shafts carried by said brackets, gears rotatable on said shafts, means connecting said motor and said gears for rotating the latter, wheels rotatable on said shafts for supporting and driving the implement, and ratchet mechanism operatively connecting said gears and said wheels.

2. In a power driven implement the combination of a frame, a motor mounted on said frame, brackets attached to said frame intermediate its ends, shafts carried by said brackets, gears rotatable on said shafts, means connecting said motor and said gears for rotating the latter, wheels rotatable on said shafts for supporting and driving the implement, a ratchet wheel attached to each of said wheels, and spring-pressed pawls on said gears for driving engagement with said ratchet wheels.

3. In a power driven implement, the combination of a substantially horizontal frame having spaced side elements, a motor mounted on said frame, brackets secured to said side elements and depending therefrom, stub shafts mounted in said brackets, hollow drum-wheels journalled on said stub shafts for supporting and driving the implement, a power shaft journalled in said brackets with the ends thereof extending laterally beyond said frame elements and into the hollow interior of said wheels, means connecting said motor with said power shaft to drive the same, and gearing operably connecting the ends of said power shaft with said wheels to drive the latter.

4. In a power driven implement, the combination of a substantially horizontal frame having spaced side elements, a motor mounted on said frame, brackets secured to said side elements and depending therefrom, stub shafts mounted in said brackets, hollow drum-wheels journalled on said stub shafts for supporting and driving the implement, a power shaft journalled in said brackets with the ends thereof extending laterally beyond said frame elements and into the hollow interior of said wheels, means connecting said motor with said power shaft to drive the same and means operably connecting the ends of said power shaft with said wheels to drive the latter, the last mentioned connecting means comprising pinions mounted on the ends of said power shaft, gears journalled on said stub shafts and meshing with said pinions, and ratchet mechanism connecting said gears with said wheels.

5. In a power driven implement, the combination of a frame having spaced side elements, a motor mounted on said frame, brackets secured to said frame elements and depending therefrom, said brackets being provided with an extension projecting above said frame elements, an operating handle secured to the extensions of said brackets, stub shafts mounted in said brackets, hollow drum wheels journalled on said shafts for supporting and driving the implement, a power shaft journalled in said brackets with the ends thereof extending laterally beyond said frame elements and into the hollow interior of said wheels, means connecting said motor with said power shaft including a counter shaft journalled in the extensions of said brackets, and gearing operably connecting the outer ends of said power shaft with said wheels to drive the latter.

In testimony whereof, I hereunto affix my signature.

OWEN J. BREADY.